(12) United States Patent
Hammond et al.

(10) Patent No.: US 8,561,896 B2
(45) Date of Patent: Oct. 22, 2013

(54) SYSTEMS AND METHODS FOR DATA COLLECTION AND PROVIDING COUPONS AT A POINT OF RETURN

(71) Applicant: The Retail Equation, Inc., Irvine, CA (US)

(72) Inventors: Mark S. Hammond, Dana Point, CA (US); Mark R. Hilinski, Claremont, CA (US); David B. Speights, Tustin, CA (US); Kenny C. Vu, Ladera Ranch, CA (US); James D. Holland, San Clemente, CA (US); Peter L. Bradshaw, San Clemente, CA (US)

(73) Assignee: The Retail Equation, Inc., Irvine, CA (US)

( * ) Notice: Subject to any disclaimer, the term of this patent is extended or adjusted under 35 U.S.C. 154(b) by 0 days.

(21) Appl. No.: 13/649,766

(22) Filed: Oct. 11, 2012

(65) Prior Publication Data

US 2013/0073408 A1    Mar. 21, 2013

Related U.S. Application Data

(63) Continuation of application No. 13/244,058, filed on Sep. 23, 2011, now Pat. No. 8,356,750, which is a continuation of application No. 12/273,775, filed on Nov. 19, 2008, now Pat. No. 8,025,229, which is a continuation of application No. 11/263,890, filed on Nov. 1, 2005, now Pat. No. 7,455,226.

(60) Provisional application No. 60/673,566, filed on Apr. 21, 2005, provisional application No. 60/672,322, filed on Apr. 18, 2005.

(51) Int. Cl.
*G06K 15/00* (2006.01)

(52) U.S. Cl.
USPC ......................................................... 235/383

(58) Field of Classification Search
USPC ................ 235/376, 383, 385; 705/28; 902/22
See application file for complete search history.

(56) References Cited

U.S. PATENT DOCUMENTS

| 5,687,322 A | 11/1997 | Deaton et al. |
| 5,832,458 A | 11/1998 | Jones |

(Continued)

FOREIGN PATENT DOCUMENTS

| CN | 1416084 | 5/2003 |
| WO | WO 2005/029284 | 3/2005 |

OTHER PUBLICATIONS

U.S. Appl. No. 11/264,469, filed Nov. 1, 2005, Hammond, et al.

(Continued)

*Primary Examiner* — Seung Lee
(74) *Attorney, Agent, or Firm* — Knobbe, Martens, Olson & Bear, LLP

(57) ABSTRACT

Systems and methods are described for collecting data at a merchant's point of return for use in processing a merchandise return transaction that is being requested by a customer. In various embodiments, the data may be collected using a wide variety of data collection technologies and may be used in conjunction with stored data, including data collected from other merchants, by a return authorization system to make a determination whether to accept or deny the requested merchandise return. The data may additionally or alternatively be used to determine whether to issue a warning to the customer about limitations on future return transactions presented by the customer. Examples of data categories that may be collected include, but are not limited to, information about: the merchant, the customer, the requested transaction, the merchandise being returned, one or more receipts, a clerk processing the transaction, and other general applicable information.

16 Claims, 9 Drawing Sheets

(56) References Cited

U.S. PATENT DOCUMENTS

| | | | |
|---|---|---|---|
| 6,016,480 | A | 1/2000 | Houvener et al. |
| 6,350,199 | B1 | 2/2002 | Williams et al. |
| 6,536,659 | B1 | 3/2003 | Hauser et al. |
| 6,834,268 | B2 | 12/2004 | Junger |
| 6,975,205 | B1 | 12/2005 | French et al. |
| 7,076,449 | B2 | 7/2006 | Tsunenari et al. |
| 7,149,530 | B1 | 12/2006 | Arakawa et al. |
| 7,455,226 | B1 | 11/2008 | Hammond et al. |
| 7,831,467 | B1 | 11/2010 | Lefebvre et al. |
| 7,970,701 | B2 | 6/2011 | Lewis et al. |
| 8,025,229 | B2 | 9/2011 | Hammond et al. |
| 8,355,946 | B2 | 1/2013 | Hammond et al. |
| 2001/0032125 | A1 | 10/2001 | Bhan et al. |
| 2001/0037207 | A1 | 11/2001 | Dejaeger |
| 2001/0041988 | A1 | 11/2001 | Lin |
| 2002/0010629 | A1 | 1/2002 | Diamond |
| 2002/0052818 | A1 | 5/2002 | Loveland |
| 2002/0072956 | A1 | 6/2002 | Willems et al. |
| 2002/0161641 | A1 | 10/2002 | Quinlan et al. |
| 2003/0004798 | A1 | 1/2003 | McAuliffe et al. |
| 2003/0023482 | A1 | 1/2003 | Messner et al. |
| 2003/0110311 | A1 | 6/2003 | Kumar |
| 2003/0225625 | A1 | 12/2003 | Chew et al. |
| 2003/0233278 | A1 | 12/2003 | Marshall |
| 2004/0039679 | A1 | 2/2004 | Norton et al. |
| 2004/0069661 | A1 | 4/2004 | Telleen |
| 2004/0088219 | A1 | 5/2004 | Sanders et al. |
| 2004/0128265 | A1 | 7/2004 | Holtz et al. |
| 2004/0172260 | A1 | 9/2004 | Junger et al. |
| 2004/0260608 | A1 | 12/2004 | Lewis et al. |
| 2005/0071228 | A1 | 3/2005 | Bortolin et al. |
| 2005/0131761 | A1 | 6/2005 | Trika et al. |
| 2005/0222904 | A1 | 10/2005 | Cotton et al. |
| 2005/0234771 | A1 | 10/2005 | Register et al. |
| 2005/0278215 | A1 | 12/2005 | Seele, Jr |
| 2006/0149577 | A1 | 7/2006 | Stashluk, Jr. et al. |
| 2006/0155603 | A1 | 7/2006 | Abendroth et al. |
| 2006/0230053 | A1 | 10/2006 | Eldering |
| 2006/0235746 | A1 | 10/2006 | Hammond et al. |
| 2006/0235747 | A1 | 10/2006 | Hammond et al. |
| 2006/0242011 | A1 | 10/2006 | Bell et al. |
| 2006/0253453 | A1 | 11/2006 | Chmaytelli et al. |
| 2006/0259262 | A1 | 11/2006 | Kuehnrich |
| 2007/0156533 | A1 | 7/2007 | Hammond et al. |
| 2008/0065485 | A1 | 3/2008 | Hammond et al. |
| 2009/0076870 | A1 | 3/2009 | Hammond et al. |
| 2011/0087606 | A1 | 4/2011 | Hammond et al. |
| 2011/0173112 | A1 | 7/2011 | Cotton |
| 2012/0166296 | A1 | 6/2012 | Hammond et al. |

OTHER PUBLICATIONS

Anonymous, "Profitable Solutions for Returns Management," 10 pages, downloaded from www.thereturnexchange.com (Internet archive documents) on Mar. 14, 2009, 2000-2001.

International Search Report for International Patent Application No. PCT/US07/76693, dated Sep. 15, 2008.

International Search Report from International Application No. PCT/US06/13431, dated Feb. 11, 2008.

Jim Milliot, "Returning to the Returns Question", Publishers Weekly, Jun. 22, 1998, vol. 245, Issue 25; p. 48, New York.

Laura Heller, "High Cost of Returns Prompts Industry Cooperation," Discount Store News, Oct. 5, 1998, vol. 37, Issue 19, p. 4.

Rogers and Tibben-Lemke, Chapter 2: Managing Returns, available online at http://www.planitroi.com/web/Gatekeeping with Returns, pp. 37-71, Management.pdf , retrieved on Dec. 13, 2006.

Screenshots of the TheReturnExchange.com dated Apr. 18, 2004 taken from Archive.org, Archive.org, Apr. 18, 2004.

Su, et al., "A Manufacturer's Optimal Quantity Discount Strategy and Return Policy Through Game-Theoretic Approach," Journal of the Operational Research Society, Aug. 2002, vol. 53, No. 8, UK.

U.S. Appl. No. 11/264,419, filed Nov. 1, 2005, Hammond, Mark et al.

U.S. Appl. No. 13/738,715, filed Jan. 10, 2013, Hammond, Mark et al.

Anonymous, www.thereturnexchange.com (Internet archive documents), 2000-2001.

International Preliminary Report on Patentability for International Patent Application No. PCT/US07/76693, dated Mar. 5, 2009.

"Capturing the Power of the POS", Chain Store Age. 06/00, vol. 76, Issue 6, p. 4A, New York, as of Dec. 13, 2006.

International Preliminary Report on Patentability for International Application No. PCT/US06/13431, dated Mar. 10, 2009.

US 8,561,896 B2

SYSTEMS AND METHODS FOR DATA COLLECTION AND PROVIDING COUPONS AT A POINT OF RETURN

This application is a continuation of U.S. patent application Ser. No. 13/244,058, filed Sep. 23, 2011, which is a continuation of U.S. patent application Ser. No. 12/273,775, filed Nov. 19, 2008, now U.S. Pat. No. 8,025,229, which is a continuation of U.S. patent application Ser. No. 11/263,890, filed Nov. 1, 2005, now U.S. Pat. No. 7,455,226, and claims the benefit of priority under 35 U.S.C. §119(e) of U.S. Provisional Application No. 60/672,322, filed on Apr. 18, 2005 and entitled SYSTEM FOR COLLECTING, ANALYZING, AND MAKING DECISIONS ON CONSUMER RETAIL DATA, and of U.S. Provisional Application No. 60/673,566, filed on Apr. 21, 2005 and entitled SMART COUPONS, the entireties of which are incorporated herein by reference.

FIELD OF THE INVENTION

The invention relates to automated processing of merchandise returns, and, in particular, to collecting data at a point of return.

BACKGROUND OF THE INVENTION

Determining when to allow retail customers to return purchased merchandise is a delicate and complex business decision that faces many merchants. On the positive side, customers typically appreciate, and have come to expect, a liberal return policy. Such a policy can engender good will towards the merchant and often encourages the customer to purchase more freely, indulging more often in "impulse buying."

On the negative side, accepting returned merchandise can expose the merchant to a number of disadvantages, including, for example, loss of a sale, possible inability to re-sell the item at the original price, extra labor and bookkeeping expenditures associated with handling the return, and a wide variety of fraudulent behaviors on the part of the customer and/or employee accepting the return.

Implementing a complex return policy that can take into account not only the current return situation but also other related information may serve the interests of the merchant, attempting to balance the above-described advantages and disadvantages, while enhancing customer good will, store reputation, as well as bottom-line profitability. Unfortunately, the customer contact person for a store's return policy is frequently a lower-tier clerk, who may not be equipped to implement such a policy or know how to use available information to help make the return authorization determination.

SUMMARY OF THE INVENTION

Systems and methods are described for collecting data at a merchant's point of return for use in processing a merchandise return transaction that is being requested by a customer. In various embodiments, the data may be collected using a wide variety of data collection technologies and may be used in conjunction with stored data, including data collected from other merchants, by a return authorization system to make a determination whether to accept or deny the requested merchandise return. The data may additionally or alternatively be used to determine whether to issue a warning to the customer about limitations on future return transactions presented by the customer. Examples of data categories that may be collected include, but are not limited to, information about: the merchant, the customer, the requested transaction, the merchandise being returned, one or more receipts, a clerk processing the transaction, and other general applicable information.

Embodiments of a method of authorizing a requested merchandise return at a merchant's point of return, comprising collecting information from multiple merchants about items being returned and providing the information to a return authorization system are described.

Embodiments of a system for authorizing a merchandise return requested at a merchant's point of return are described. The system comprises a point of return device configured to accept input about items presented for return, and to provide the information to a return authorization system that receives information collected from multiple merchants.

Embodiments of a system for authorizing a requested merchandise return at a merchant's point of return are described. The system comprises means for collecting information from multiple merchants about items being returned and means for providing the information to a return authorization system.

For purposes of summarizing embodiments of the invention, certain aspects, advantages, and novel features of the invention have been described herein. It is to be understood that not necessarily all such aspects, advantages, or novel features will be embodied in any particular embodiment of the invention.

BRIEF DESCRIPTION OF THE DRAWINGS

A general architecture that implements various features of specific embodiments of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

DETAILED DESCRIPTION OF THE PREFERRED EMBODIMENTS

Figure 1:
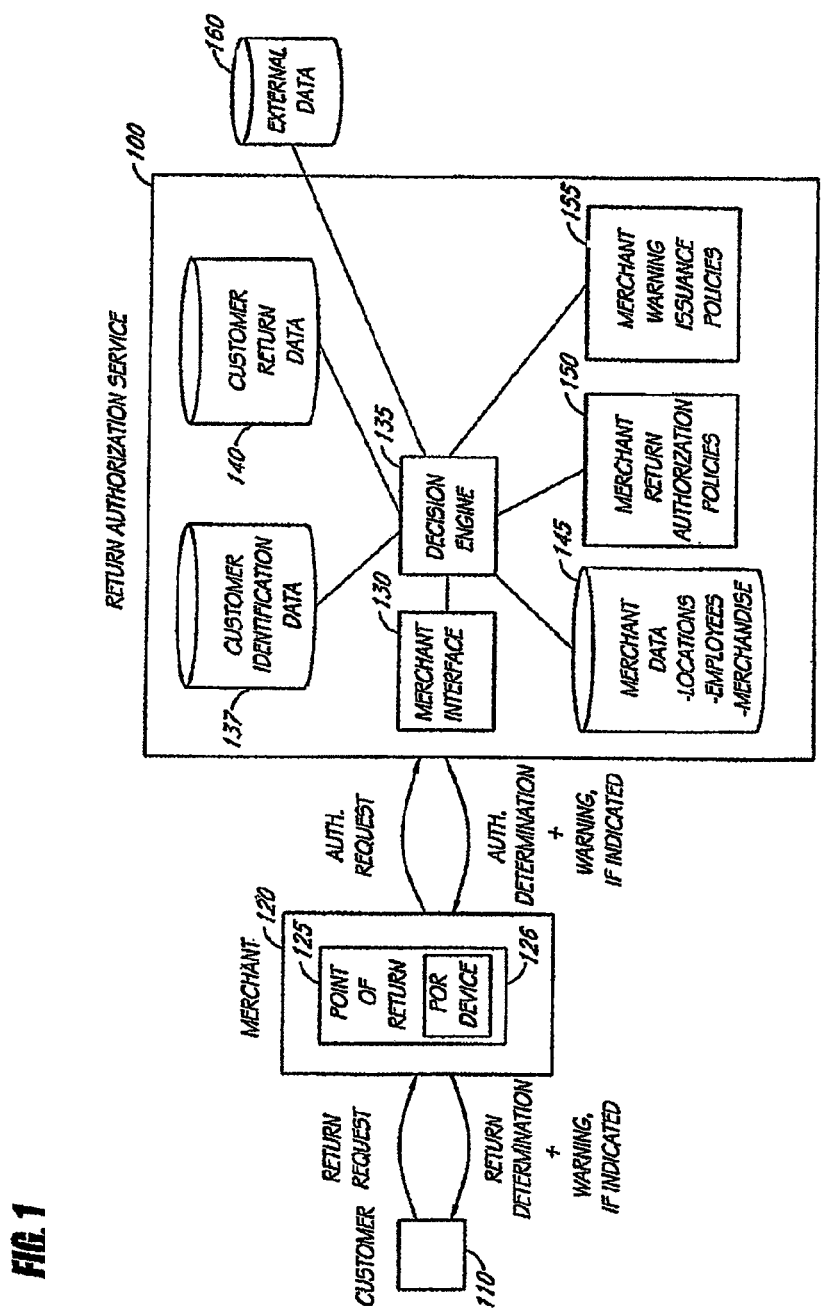
FIG. 1 is a block diagram depicting one embodiment of a merchandise point of return system.

Embodiments of computer-implemented systems and methods are described that provide warnings to customers requesting to return to a merchant merchandise that has purportedly been previously purchased. The warnings are based, at least in part, on a risk assessment of the customer's current and past return activity and on the merchant's return policies. For example, in some embodiments, the assessment is implemented using a score calculation. When the consumer presents previously purchased merchandise for return, data about the requested return, about the consumer, and about a clerk processing the return may be entered into a computerized point-of-return (POR) device, and, based, at least in part, on the inputted data, a computer-calculated score or other computer-implemented assessment is generated to assess the likelihood that the requested return transaction is fraudulent or is abusive of the merchant's return policies. Acceptance of the returned items by the merchant may be based, at least in part, on the calculated score or other authorization assessment. In some embodiments, the authorization recommendation may be manually overridden at the point of return by a clerk, manager or other authorized representative of the merchant.

Various types of data about the requested return merchandise may be collected, including, for example, amount, type, and value of items being presented for return. In some embodiments, product identifiers, such as a Stock Keeping Unit code (SKU), Universal Product Code (UPC), Radio Frequency Identifier (RFID), and the like, may be used to identify the merchandise and may be further used to access stored information about the merchandise. Other data about the current return transaction, and about one or more original purchase transactions associated with the merchandise to be returned, such as receipt identifier, date and time, and store number and location, transaction identifier, cashier identifier, register number, and the like may also be collected by the POR device.

In addition to the data about the current transaction, the score or other assessment may be based on stored information about the customer's past return activity and other stored data that is available to the computerized system. For example, as was the case with the current transaction, information including, but not limited to, information about one or more dates, locations, return amounts, merchant types, clerks, and the like, associated with past return transactions may be input and/or retrieved. Identification data about the customer and about a clerk processing the requested return may be collected by the POR device and may allow for retrieval of stored data associated with these two people who participate in the return transaction and are thus sources of potential fraud. Additionally, in some embodiments, the system may take into account information about other consumers present in the store at the time of the current or past transactions, police reports about stolen merchandise in the area, information about criminal activity associated with the consumer or the clerk, as well as other unexpected relationships.

In some embodiments where authorization is assessed using a scoring system in which a low score indicates low risk, typically, if the customer makes returns infrequently, the score will remain low. Behavior that has been deemed to be indicative of fraud or abuse may drive the score up towards a threshold for being denied and may continue to influence future score calculations. Thus, a warning may be generated by the POR device if the analysis indicates that additional requests from the customer to return merchandise may be subject to a denial. A practitioner of skill in the art will appreciate that in other embodiments that also use a score for an authorization determination, a low score may indicate a high risk, or some other association between score and authorization may be used, and algorithms for authorization and/or determining whether to issue a warning may be adjusted accordingly. Furthermore, in embodiments that authorize or decline return transactions using a non-scoring system, such as a non-scoring rule-based system, systems for determining whether to present a warning may be adjusted accordingly without departing from the scope and spirit of the systems and methods described herein.

In another embodiment, the system provides smart coupons at the point of return. The purpose of a smart coupon at the point of return is to encourage a good customer who has returned merchandise to a retailer to spend the money he or she just received (due to making the return) at that retailer.

In one embodiment, the system consists of a point-of-return terminal, a return authorizer, a coupon qualifier, and a consumer database.

When a consumer requests a return, the store associate serving the consumer uses the point-of-return terminal to enter information about a return, including:
  Associate identification (login ID)
  Consumer identification (one of DL #, passport number, etc.)
  Return dollar amount
  Number of items being returned
  Type of return (exchange, return)
  Purchase receipt information (date, location, register, SKU information)

The point-of-return terminal transmits the return information to a return authorizer. It appends the return information to a file on the consumer (called a "consumer file") in the consumer database (and creates a consumer return file if the consumer is not already in the database). The consumer file contains the consumer's return history for the retailer as well as, optionally, the consumer's purchase history at the retailer. The authorizer then reviews the consumer's history and, using the information in the history, determines if the consumer's return should be accepted. If the authorizer determines that the return should be accepted, then the coupon qualifier reviews the consumer's history to determine if the consumer should receive a coupon.

Factors the coupon qualifier takes into account to make the determination include the consumer's cumulative profitability with the retailer, the consumer's return history, the consumer's product preferences, etc.

The coupon qualifier provides its result to the return authorizer. The return authorizer then transmits a response to the point-of-return terminal that includes both the recommendation regarding the return and the recommendation regarding the coupon. It displays both recommendations to the store associate, prints a return receipt and, if recommended by the coupon qualifier, a coupon. The store associate processing the return informs the consumer of the result and provides the return receipt and coupon, if any to the consumer.

FIG. 1 is a block diagram depicting one embodiment of a merchandise point of return system. A customer 110 who wishes to return previously purchased merchandise brings the merchandise to a point of return 125 at a merchant establishment 120 and requests to receive an equivalent dollar amount of either cash, credit, merchandise, or some combination or equivalent thereof. The point of return 125 may be a desk or location within the merchant establishment 120 that is dedicated for processing merchandise returns. Alternatively, the point of return 125 may be a normal checkout terminal or cashier's station that may be additionally used for processing purchases and other types of business transactions, or the point of return 125 may be another location.

For purposes of this disclosure, the systems and methods described herein will frequently be described with reference to a clerk or other merchant employee who receives a merchandise return request from a customer 110 and who accepts or denies the return request, based, at least in part, on a recommendation received from one or more of the systems and methods described herein. In various embodiments, the actions attributed to the clerk may alternatively or additionally be carried out by another type of merchant employee or representative, or other person authorized to handle the merchandise return, or by an automated process or system configured to process the return request. Thus, while, for ease of description, the systems and methods will be described with reference to a clerk at a point of return 125, it should be understood that embodiments of the systems and methods may also be carried out with one or more of the above-listed, or other, clerk alternatives.

The clerk may use an automated point of return (POR) device 126 for processing the requested merchandise return. The POR device 126 may be used to input information about the requested return and to provide authorization information for the return to the clerk handling the return. In some embodiments, a device dedicated for use with merchandise returns may be used in association with the systems and methods described herein. One embodiment of such a dedicated POR device 126 is described with reference to FIG. 3 below. In other embodiments, the POR device 126 is at least one of: a hand-held device, a wireless device, a telephone-assisted device, a self-serve kiosk, an assisted-return kiosk, or other suitable apparatus. In some embodiments, rather than using a dedicated POR device 126, a multi-functional checkout terminal or other computerized device may be configured to provide some or all of the functionality associated with the POR device 126 described herein. In some embodiments, more than one device may be used to provide some or all of the functionality described herein for the POR device 126. Thus, while the systems and methods described herein may be described with reference to a dedicated POR device 126, it is to be understood that a wide variety of dedicated and/or multi-purpose POR devices 126 may be used without departing from the spirit of the invention as described herein.

In various embodiments, merchants 120 have a return policy that outlines conditions for accepting returned merchandise. For example, the merchant 120 may stipulate that the customer 110 has a receipt associated with purchase of the item to be returned, that the return take place no more than thirty days after the purchase date, that the item be in its original packaging and/or has not been used, and so forth.

In some embodiments, a sign is posted at a merchant's establishment that includes one or more criteria for acceptance of a merchandise return. For example, the criteria may state that the merchandise return will be accepted if a customer making the merchandise return has returned fewer than X times in the last Y days, totaling less than Z dollars of merchandise, where X, Y, and Z are values that may be determined by the merchant, and where any two or more of values may be the same value or may be different values.

The following is one example of a set of return policy rules that the merchant 120 may post for the information of customers and that may serve as a public warning to customers regarding the merchant's merchandise return rules:
"ABC STORE RETURN CRITERIA. ABC Store will honor a return or exchange under the following conditions. Customers are hereby warned that returns that exceed these conditions may be denied:"
  "With a receipt: ABC Store will accept the return if it is the customer's third or earlier return in the previous thirty days."
  "Without a receipt: ABC Store will accept the first non-receipted return in any fifteen day period if it is less than $65 and the customer has fewer than four previous returns in the previous thirty days."
  "ABC Store may deny a customer's return if the customer was unable to provide an approved ID, if the receipt date exceeds ABC Store's thirty day policy, if the customer has already been denied a return during the last thirty days or advised that they would not be allowed to return within thirty days."
  "Returns outside these guidelines may be considered excessive based on certain circumstances, which include unusual frequency, excessive total dollar amount and/or returns in multiple store locations and are subject to denial."

Merchants 120 may implement this or any of a wide variety of other return policies to suit their business goals. For example, merchants 120 may implement different return policies for different classes of items, stipulating, for example, that software merchandise returns must still be in their original, unopened packaging, while returns of other types of products may be accepted, even with opened packaging. In accordance with some merchant return policies, certain types of merchandise are not accepted for return. As another example, a merchant 120 may desire to implement a more liberal return policy during the post-holiday season when the point of return 125 counters experience a higher-than-normal volume of returns. Based at least in large part on the return policy used by the merchant 120, a clerk, or other person or process, at the point of return 125 may accept or deny the customer's 110 returned merchandise.

As depicted in FIG. 1, authorization determination for the customer's requested return may be handled by an automated return authorization service 100. The return authorization service 100 may accept information input by the clerk at the point of return 125 and use various types of information associated with the requested return in order to implement the merchant's 120 return policy and to assess risk of exposure to fraudulent, abusive, or unprofitable behavior that may be associated with accepting the requested return.

In some embodiments, the return authorization service 100 may be implemented, as depicted in FIG. 1, as an external entity whose services are contracted or otherwise provided to the merchant 120. Additionally or alternatively, the return authorization service 100 may be implemented as one or more software and/or hardware components under the operation of the merchant 120 that function in the POR device 126 and/or within one or more computer devices at the point of return 125, at another location within the same physical merchant establishment and/or at a geographically removed location used by the merchant 120. Thus, although the systems and methods described herein are most often described in association with an external return authorization service, it is to be understood that any combination of these or other implementation arrangements may be used without departing from the spirit of the invention described herein.

In embodiments where the return authorization service 100 is a separate entity that assesses and authorizes requested returns presented to the merchant 120, communication between the merchant's point of return 125 and the return authorization service 100 may be carried out using any of a wide variety of appropriate devices and/or communications and data security technologies. For example, the communications between a computerized device at the merchant's point of return 125 and a merchant interface 130 at the return authorization service 100 may be carried out using the Internet or other global network. In other embodiments, the communications may be carried out using any communication system including by way of example, dedicated communication lines, telephone networks, wireless data transmission systems, two-way cable systems, customized computer networks, interactive kiosk networks, automatic teller machine-type networks, interactive television networks, and the like.

The clerk handling the requested return uses the POR device 126 to send information about an authorization request to the return authorization service 100. The return authorization service 100 receives the information from the POR device 126 and uses the information, together with other stored information, to make an authorization determination for the requested merchandise return, assessing the risk of accepting the return and implementing merchant return policy preferences to recommend either that the clerk accept the requested return, refuse to accept the requested return, or take another course of action.

In some embodiments, as will be described in greater detail below, the return authorization service 100 may provide a warning to the customer 110 together with a positive authorization determination, indicating that although the current return request is being accepted, authorization of future return requests from the customer may be limited.

As another example, in accordance with some store policies, as an alternative to accepting the requested return, the authorization service 100 may provide an authorization determination recommending that the clerk offer store credit or some other alternative in place of a requested cash exchange for the cash value of the returned merchandise. In some embodiments, the authorization service 100 may also provide a recommended timing for paying the consumer. For example, the authorization service 100 may recommend mailing a check to cover the return amount, crediting an account in the future, implementing a cooling-off period, requiring further review before authorization, or the like.

The embodiment of the return authorization service 100 that is depicted in FIG. 1 includes a merchant interface 130, a decision engine 135, a customer identification data repository 137, a customer return data repository 140, a merchant data repository 145, a repository of merchant return authorization policies 150, and a repository of merchant warning issuance policies 155. Other embodiments of the return authorization service 100 may include other components and/or a subset of these components. For example, some embodiments may include only the decision engine 135 and may access information from other sources.

The merchant interface 130 receives an authorization request from the merchant point of return device 126 and accepts information about the requested merchandise return sent from the POR device 126. The received information is sent to a decision engine 135 for assessing risk associated with accepting the requested merchandise return and for making an authorization determination that is based on the assessed risk as well as on stored information about the merchant's return authorization policies 150. The return policy 150 may be implemented in a variety of computer-usable forms, including, but not limited to, rule-based systems, decision trees, scorecard systems, and the like. In various embodiments, the decision engine 135 may assess the requested return transaction with reference to one or more threshold conditions, such as an acceptable score. In some score-based embodiments, in which a high score indicates low risk, if the requested return transaction meets or exceeds the threshold, the return is accepted, while if the requested return does not meet the threshold, the return is denied. In other embodiments, other methods of assessing whether to accept the requested return may alternatively or additionally be used.

The decision engine 135 may also use stored information about the merchant's warning issuance policies 155, if available, to determine if a warning is to be issued to the customer. The warning policy 155 may also be implemented in a variety of computer-usable forms, including, but not limited to, rule-based systems, decision trees, scorecard systems, and the like. In some embodiments in which assessment is carried out by a scoring system, in which a lower score indicates higher risk, when the decision engine 135 determines that the return transaction has exceeded the threshold by only a small margin that falls within a predetermined range of margins, a warning to the customer 110 may be issued along with the acceptance, alerting the customer 110 that acceptance of future returns may be limited, based on additional return activity.

In addition to stored information about the merchant's return and warning policies 150, 155, the decision engine 135 may also use information from one or more other repositories of data collected and maintained by the return authorization service 100, or from one or more external merchant or non-merchant data sources 160.

For example, the decision engine 135 may access stored merchant data 145 that may include any of a wide variety of types of information associated with the merchant 120, including, but not limited to: information about the location(s) of the merchant's stores or other establishments, information about the merchant's employees (including names, identification numbers, hire dates, home addresses, past association with proper, fraudulent, and/or questionable merchandise returns, and the like), and information about the merchant's 120 inventory of merchandise.

The decision engine 135 may use information stored in a repository of customer identification data 137. The repository of customer identification data 137 may store information about a large number of customers, including, for example, information about customer names, addresses, identification numbers, such as driver's license and other identification numbers, biometric identification information, and the like. This information may be used in an effort to positively identify the customer 110.

The decision engine 135 may also use information from one or more repositories of customer return data 140, which include a wide variety of information about past merchandise return activity associated with the individual customers 110. Some examples of information associated with past purchase and return transactions are described in greater detail with reference to FIG. 6 below. In some embodiments, the customer return data repository 140 may also include information about the customer's 110 purchase history. Using the customer identification data 137 and the customer return data 140 allows the decision engine 135 link information about past merchandise return activity with the customer 110 requesting the return at the point of return 125.

In some embodiments, a "negative file," such as a listing of customers 110 who are known to have been involved with past fraudulent returns or past criminal activity, may be maintained and used to make return authorization determinations. In some embodiments, one or more "positive files" may exist that list customers who may be accorded special treatment by the return authorization service. For example, one or more positive files may be maintained to list customers known to be profitable to the merchant and/or customers in the entertainment industry, or other categories of customers, who may be accorded special return privileges. Such positive files may be used to make return authorization determinations.

In some embodiments, agreements may be implemented allowing merchants to share their collected data for return authorization purposes.

Furthermore, the decision engine 135 may additionally or alternatively access and make use of information stored in data repositories that are external to the return authorization service 100. External data sources may be used to access information such as, for example: customer and/or employee identification information, address information including postal box information, credit data, shoplifting data, crime data, identification theft data, sales tax data, or any of a wide variety of other useful information types. Such external data may be accessed externally on an as-needed basis and/or may be stored by the return authorization service 100 for subsequent use.

The functions of the decision engine 135 may be carried out in any of a wide variety of suitable, computer-implemented forms, such as a decision tree, an expert system, or other ruled-based decision system, as a linear calculation or other scoring mechanism, or as a form of probabilistic or neural network, genetic, or other statistical model or algorithm for decision-making. A more detailed description of factors that may be used by the decision engine 135 to make a return authorization determination and/or to determine whether to issue a warning associated with the requested return will be provided with reference to FIG. 6 to follow.

For ease of description, the return authorization service 100 as depicted thus far in the disclosure and with reference to FIG. 1 has been described as providing merchandise return authorizations and other related services to a single merchant 120. However, it is to be understood that, in practice, it is much more common for the return authorization service 100 to serve a plurality of merchants 120. When the return authorization service 100 serves a plurality of merchants 120, it may maintain an associated plurality of data stores, including, but not limited to: the customer return data repository 140, the merchant data repository 145, the merchant return authorization policies 150, and the merchant warning issuance policies 155, for each of the merchants 120 for whom it provides return authorization services. The return authorization service 100 may maintain these data stores separately, either logically and/or physically. Furthermore, the return authorization service 100 may combine some or all of the various data stores described above.

Thus, although a wide variety of embodiments exist, for ease of description in this disclosure, it will be assumed that the embodiments of the return authorization service 100 described herein maintain data received from different merchants 120 separately, and do not use data received from one merchant to make an authorization return determination for another merchant. In other embodiments, however, modifications may be made to the systems and methods described herein such that the systems and methods may store data from a plurality of merchants together and/or may use data from one merchant in a return authorization request from another merchant. Furthermore, data from external third-party data providers, such as government information sources, credit bureaus, police information sources, and the like may be used by the return authorization service 100 to make authorization and/or warning determinations for the merchant 120.

The return authorization service 100 and included modules 130, 135, 137, 140, 145, 150, 155, as depicted in FIG. 1, are one embodiment of a return authorization service 100 in connection with the systems and methods described herein. It is to be understood that in other embodiments, the structures and functions of these modules may be implemented in a wide variety of different configurations without departing from the spirit of the systems and methods described herein. For example, some or all of the data storage functions, the decision-making functions, the communications functions, and the like, may be provided by external third-party service providers, may be implemented at one or more merchant locations, including within the POR device 126, and/or may be implemented differently using different internal structures. Furthermore, although the return authorization service 100 is depicted in FIG. 1 as being a single entity located at a single location, it is to be understood that in other embodiments, the structures and functions of the return authorizations service 100 may be implemented in total or in part by a distributed system of hardware and software that may be located at two or more physically distinct locations.

Once the decision engine 135 has made an authorization determination for the requested return, the merchant interface 130 may send a message to the point of return device 126, informing the clerk of the determination. In some embodiments, the point of return device 126 may then print a record of the requested return, indicating that the return has been accepted or denied. The record may include associated explanations, and, in some embodiments, a warning about limitations on the acceptance of future merchandise returns from the customer 110.

Figure 2:
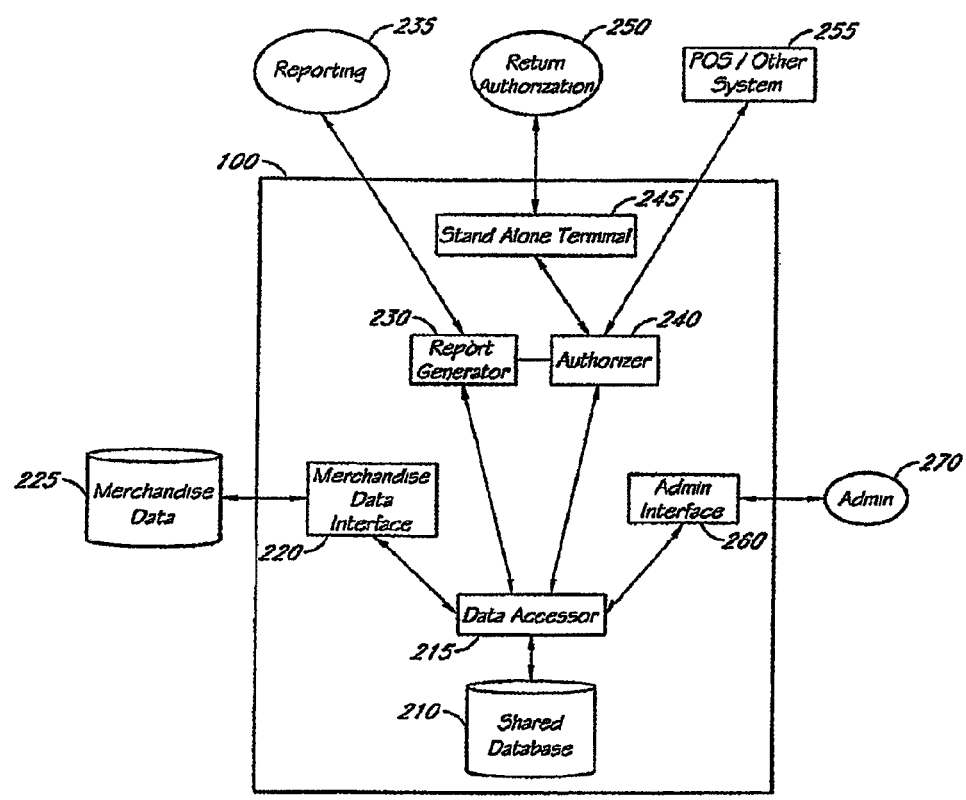
FIG. 2 is a block diagram depicting a closer view of one embodiment of a return authorization service.

FIG. 2 is a block diagram depicting a closer view of one embodiment of a return authorization service 100 that provides a variety of services to the merchant 120. As depicted in FIG. 2, the various repositories of data used by the return authorization service 100 are combined conceptually as a single shared database 210. As described with reference to FIG. 1, the data stored for use by the return authorization service 100 may be stored and maintained as a single or a plurality of data repositories.

The data in the shared database 210 is managed by a data accessor 215 that receives data for storage in the shared database 210 from a variety of sources and that receives requests for data from the shared database 210 for a variety of purposes. In various embodiments, the data accessor 215 may manage the various types of data using any of a variety of computer-implemented platforms suitable for such purposes, including, but not limited to, DB2, Oracle, or other SQL-based systems.

As depicted in FIG. 2, merchandise data 225 from a merchant 120 may be sent to a merchandise data interface 220 of the return authorization service 100 for storage in the shared database 210 by the data accessor 215. Merchant administrators 270 may use an administrative interface 260 of the return authorization service to send and receive data to the data accessor 215.

The data accessor 215 may further provide data to a report generator 230 that provides reporting services 235 to the merchant 120. Examples of data reported for a given period may include, for example: total number of returns, total number of items returned, total dollar value returned, total number of requested returns denied, identification of customers whose returns were denied, return statistics by store branch, and the like. Reports for merchants may include daily transaction reports, as well as longer term reports for loss prevention analysis.

In some embodiments, reports may also be made available to customers 110, and especially to customers whose return requests have been denied, or who have received a return-related warning. The customers may wish to know what information is stored about their merchandise purchase and/or return activity, including, for example, store(s) returned to, any authorizations and denials, and dates and dollar amounts of requested return(s).

An authorizer module 240, which may comprise, for example, the decision engine 135 that is described with reference to FIG. 1, provides return authorization determinations 250. As depicted in the embodiment shown in FIG. 2, the authorizer 240 may communicate directly with a stand-alone terminal 245 that is dedicated for point-of-return use. The authorizer 240 is further configured to communicate with a point-of-sale or other system 255 used by the merchant to process merchandise returns and to communicate with the return authorization service 100.

In various embodiments, transfer of some or all of the data into and out from the return authorization service 100 may be implemented, for example, using FTP transfer protocols. For protection of consumer privacy and merchant business information, the data is preferably transferred into and out from the return authorization service 100 in an encrypted form, for example using PGP (Pretty Good Privacy) or other suitable encryption technology.

The functions and/or components of the return authorization service 100 described with reference to FIG. 2 may be implemented, in some embodiments, as a plurality of servers operating as a server farm under the management of any of a variety of clustering technologies. Such an arrangement typically allows for relatively seamless replacement of components as well as upgrades and additions to the system as transaction volume increases.

Furthermore, the functions and/or various modules of the return authorization service 100 may be implemented in various embodiments using personal computers (PCs), workstations, other processors, program logic, or other substrate configurations representing data and instructions, which operate as described herein. In various embodiments, the processors may comprise controller circuitry, processor circuitry, processors, general purpose single-chip or multi-chip microprocessors, digital signal processors, embedded microprocessors, microcontrollers and the like.

Figure 3:
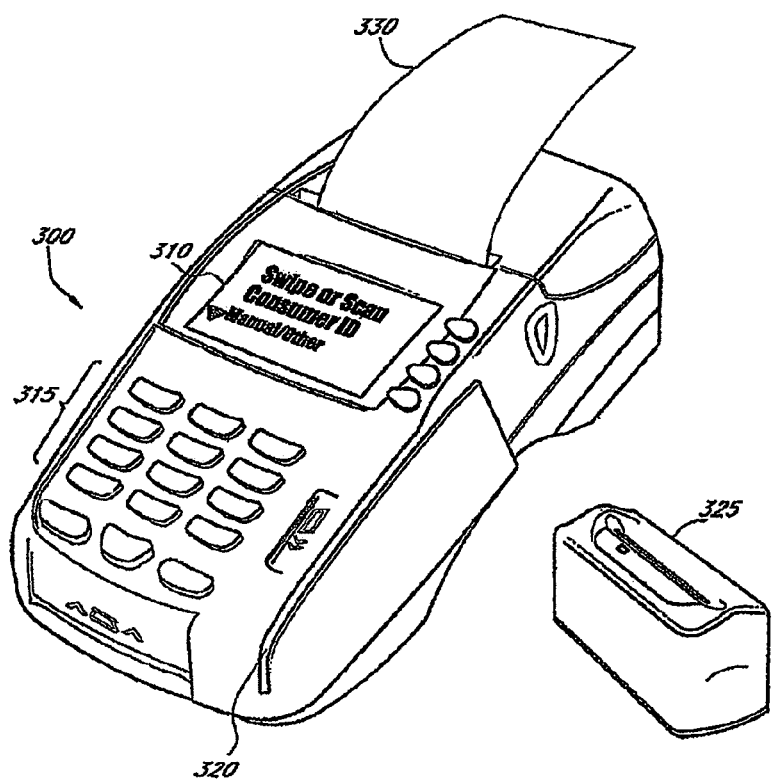
FIG. 3 depicts one embodiment of a dedicated point of return device.

FIG. 3 depicts one embodiment of a dedicated point of return (POR) device 300 for use in processing merchandise returns. The POR device 300 in FIG. 3 is configured to use a telephone dial-up connection or network cable connection to communicate with the return authorization service 100. In other embodiments, one or more other wired or wireless communications systems are used for communicating with the return authorization service 100. In some embodiments, some or all of the functions provided by the return authorization service 100 may be provided by components that are internal to the POR device 300.

As depicted in FIG. 3, the POR device 300 includes a display screen 310 for communicating visually with a clerk or other person handling the requested return transaction. Examples of communications that may be presented on the display screen 310 are described with reference to FIG. 4 to follow. In other embodiments, the POR device 300 may include audio speakers, video display, or any of a wide variety of other communications technologies for communicating information to the clerk.

The POR device 300 also includes a keyboard 315 with a plurality of buttons that allow the clerk to input information to the POR device 300. Additionally, other buttons and input systems in other parts of the POR device 300 also allow the clerk to input information to the POR device 300. In other embodiments, any of a wide variety of other input systems, such as voice recognition systems, keyboards, touch screen systems, camera or video systems, biometric systems, and the like, may be used additionally or alternatively for allowing the clerk to input information into the POR device 300. Furthermore, other forms of electronic reading devices, including, but not limited to, 1-dimensional, 2-dimensional, or 3-dimensional barcode scanners, magnetic stripe readers, readers for other electronically-readable codes, RFID readers, any of a wide variety of biometric data input devices, and the like, may be used to input data to the POR device 300. For example, the POR device 300 depicted in FIG. 3 includes a built-in magnetic stripe reader 320 for scanning identification cards, credit cards, and the like that include a magnetic stripe, and a peripheral 2-dimensional bar code scanner 325 for reading cards provided with a 2-dimensional barcode. Other peripherals for inputting data about a wide variety of other identification and informational sources may also be used.

As shown in FIG. 3, the POR device 300 may be configured to produce a paper receipt 330 or other record of the merchandise return transaction for the customer 110 and/or for the clerk on behalf of the merchant 120. In other embodiments, a record of the transaction may be provided to the customer 110 using email or other electronic communications technology. Where the customer 110 is requested to sign a record of the return transaction, the POR device 300 may include a system for electronically capturing the signature or other form of customer acknowledgement. In some embodiments, an indication of a warning provided to the customer 110 at the point of return 125 is printed, or otherwise displayed, on the receipt 330.

As described above, the functions of the POR device 300 may additionally or alternatively be provided by other types of electronic devices, such as a suitably programmed and configured point-of-sale (POS) terminal, cash register terminal, or other device that may process merchandise returns as well as other types of transactions and that may use technologies such as biometrics, bar-code readers, and the like.

Figure 4:
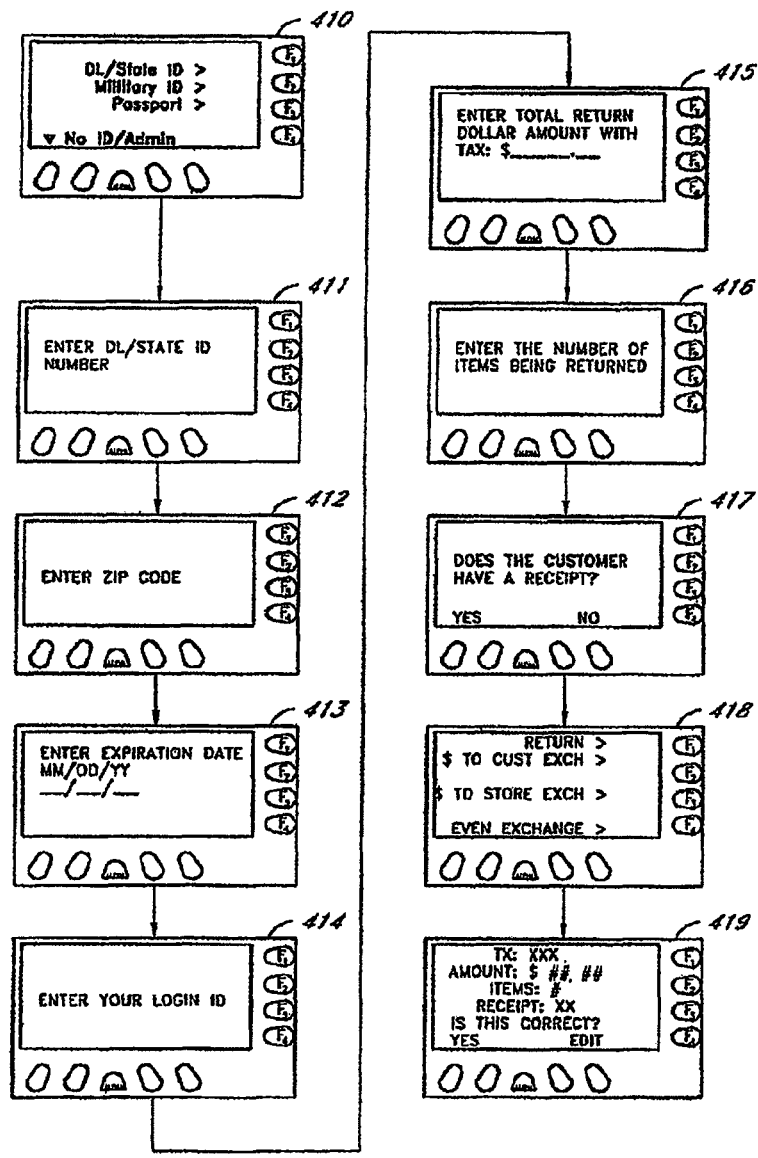
FIG. 4 depicts a series of user interface screenshots for one embodiment of a process for collecting data at a point of return.

FIG. 4 depicts a series of sample user interface screenshots 410-419 for one embodiment of a process for collecting data at a point of return 125. The screenshots 410-419 depicted in FIG. 4 exemplify screenshots that may be presented on a display screen 310 of a POR device 300 such as the one depicted in FIG. 3.

The screen shots 410-419 represent prompts to the clerk to input information associated with the requested merchandise return so that a return authorization determination may be made for the requested return. In the sample screenshots shown in FIG. 4, the first four screenshots 410-413 represent prompts for information about the customer 110 requesting to make the return. Screenshot 414 represents a prompt for the clerk to enter identifying information about him/herself. Screenshots 415-418 represent prompts for the clerk to input information about the requested merchandise return transaction, and Screenshot 419 represents a prompt for the clerk to verify, and, if need be, edit, the information previously input to the POR device 300 before the information is sent to the return authorization service 100 with a request for an authorization determination.

More specifically, in Screenshot 410, the clerk is prompted to indicate which kind (if any) of identification verification the customer 110 is providing. In Screenshot 411, assuming that the clerk indicates that the customer 110 is presenting a driver's license or other state identification card, the clerk is now prompted to input the driver's license number or state identification card number. As was discussed above, this information may be keyed in, read electronically from a magnetic stripe, barcode, or other smart card reader, or input using any of a wide variety of other input technologies.

Furthermore, in various embodiments, if desired, the POR device 126 may be configured to alternatively or additionally accept input about other types of identification, such as other types of U.S. government-issued identification numbers, or Canadian or Mexican identification numbers. Examples of identification that may be used, alone or in combination with one another, include, but are not limited to numbers, identifiers or other data associated with: student identification, military identification, passport, voter registration card, Immigration and Naturalization Service documents (such as a green card or laser visa), consular identifications (matricula consular and others), loyalty card, gift card, coupon, merchandise credit slip, receipt authorization code, checking account, receipt date or other combination of receipt data identifiers, name, address (current and/or past), date of birth, phone number, SSN, credit card, debit card, biometrics (photo, face, fingerprint, voice, DNA, retinal), employer identification number, digital image of the customer obtained from license, customer birth date and/or age, driver's license expiration date, security system number, and many other types of accounts and identifiers.

In Screenshot 412, the clerk is prompted to input the customer's zip code, which may be used, for example, to assist in verifying correct identification of the customer 110, as well as to provide information about the distance from merchant establishment to the customer's home, which may be used in some embodiments of the authorization determination. In Screenshot 413, the clerk is prompted to input the expiration date of the customer's driver's license or state identification card. In Screenshot 414, the clerk is prompted to enter a login ID or other employee identification number. In Screenshot 415, the clerk is prompted to enter the total dollar return amount requested by the customer 110. In Screenshot 416, the clerk is prompted to enter the total number of items being presented for return by the customer 110. In Screenshot 417, the clerk is prompted to enter whether the customer 110 has a receipt for the items being returned.

In Screenshot 418, the clerk is prompted to enter the type of return being requested by the customer 110. For example, the customer may be requesting to return the merchandise for a cash exchange (or credit to an account on which it was originally charged), for an even exchange with merchandise priced exactly the same, or for a merchandise exchange when a new merchandise purchase is presented to the clerk as part of the return transaction and for which a dollar balance is due to either the customer or to the store. In other embodiments, the customer may request and/or be offered an opportunity to exchange all or a portion of the merchandise for a gift card, store check, store credit, debit card, credit card, or other suitable tender or medium of exchange, and the POR device 126 may be configured appropriately to capture that information.

In Screenshot 419, the clerk is presented with a summary of the inputted transaction information. The return transaction is assigned an identification number, and the clerk is prompted to verify that the exchange dollar amount and number of items have been correctly entered. The clerk is also prompted to verify whether a purchase receipt has been provided with the return request. The clerk provides an input indicating either that the information is correct or that the information needs to be edited.

The screenshots of FIG. 4 have been provided as an example of a POR device 126 user interface interaction for inputting information about a requested merchandise return. As will be familiar to one of skill in the art, a wide array of variations may exist in the exact methods used to obtain information about the requested return at the point of return 125. The content and order of screenshot displays, for example, may be different than those depicted in FIG. 4, and, in fact, the clerk may be expected to input the relevant data in response to an interactive voice response (IVR) system or without the use of prompts at all. In some embodiments, the POR device 126 may be configured to allow for the collection of some or all of the following additional information: retailer identification, consumer name and address, current price of the returned items, identifier (such as SKU number, UPC, or other type of identifier) of the returned items, product condition, customer's stated reason for making the return, purchase date, time, tender type, and original salesperson, original sales transaction identifier, as well as other types of information.

Furthermore, the POR device 126 may preferably be configured to automatically transmit some additional information to the return authorization service 100 with the request for authorization determination. For example, an identifier associated with the POR device 126 may be transmitted to the return authorization service 100 and may be used to identify the merchant 120, the store branch or other location at which the point of return device 126 is located, as well as the date and local time of the requested return transaction, and the like.

As will be described with reference to FIG. 6, in various embodiments, the determination whether to authorize a requested return, and, similarly, whether to issue a warning along with an authorization approval, may depend on a wide variety of factors, some of which may involve the input of data at the point of return 125. Accordingly, the series of prompts that are displayed to the clerk may be adjusted to prompt for data appropriate to the given embodiment.

Figure 5:
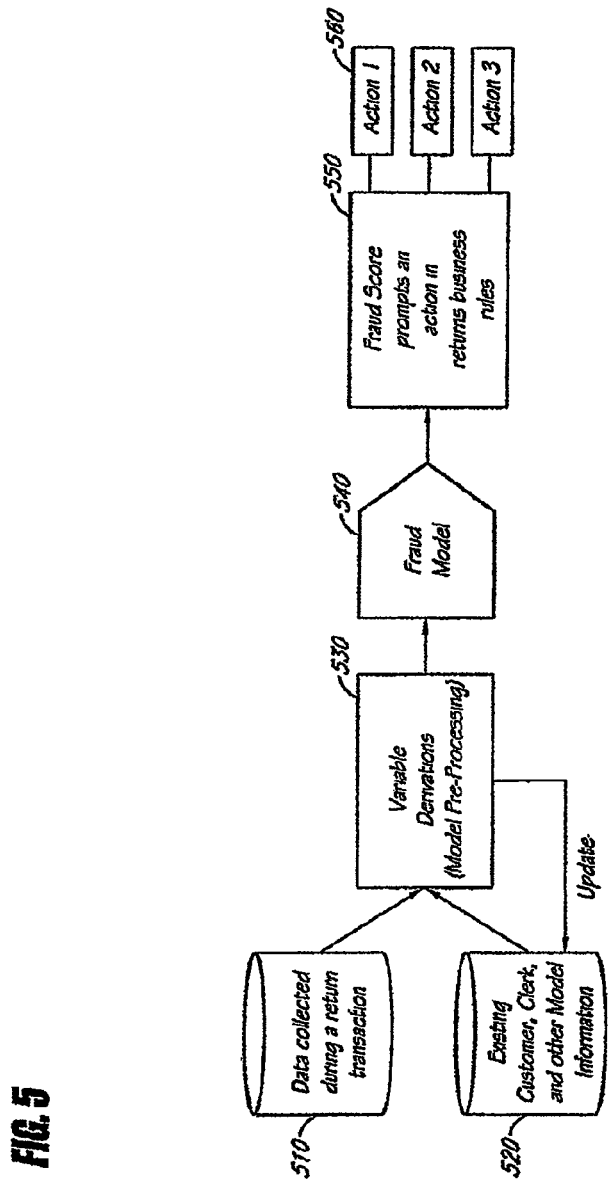
FIG. 5 depicts one embodiment of a fraud model architecture.

FIG. 5 depicts one embodiment of a fraud model architecture that may be used to implement one or more statistical models used by the decision engine 135 of the return authorization service 100. In various embodiments, the statistical models accept information available at the time of a merchandise return transaction and provide an outputted score or other assessment that represents a relative likelihood that the requested return is abusive or fraudulent. The assessment may be integrated into a return authorization process to provide an authorization determination to a clerk processing the return transaction at the point of return 125.

As depicted in FIG. 5, data collected during a requested return transaction 510, together with existing stored data 520, which may comprise information about the customer, the clerk, the store, and/or other stored data, are processed to create variables 530 that are indicators of fraud.

Examples of the types of stored data 520 that may be used may include, but are not limited to: current and past return-related transaction data from this customer 110 at this and other branches of the merchant's establishment 120, other transaction data collected from point-of-sale systems operated by the merchant 120, employee records, information regarding the merchandise whose return is being requested, transaction data collected at points of return 125 from other customers thought to be related to this customer 110 by home address, family name, or other connecting data, information about the store where the return is taking place, information about the merchant, and/or information associated with seasonal considerations associated with return transaction activity. Other types of data that may be used include, but are not limited to, merchandise SKU codes or other identifiers, data from other merchants, criminal records, address history records, credit data, data about identification theft, address information, and the like.

The variables 530 may be simple variables, based directly on data inputted at one or more POR devices 126, such a number of items being returned, and/or may be more complex variables that the system calculates based on two or more pieces of stored or inputted data, such as a percent, average, median, maximum, minimum, or sum of other data item subsets, values relating to a person's pattern of travel, measure of consumer profitability, sales and return seasonality, and any other value which can be derived from the stored and/or inputted data. The variables 530 may be used to update the repository of stored data 520 and are used to create or supply input data to a fraud detection model 540.

As will be familiar to one of skill in the art, a wide variety of methods, including ruled-based, statistical, and other methods, are available for use, alone or in combination, to construct a model for use with a decision-making system. For example, the fraud detection model 540 may be created using one or more statistical methodologies, including, for example, logistic regression, linear regression, discriminant analysis, or some other modeling technique such as fuzzy logic systems, feed-forward neural networks, Bayesian or other probabilistic system. The fraud detection model 540 uses the variables 530 to determine a fraud score 550 that indicates the determined likelihood that fraud is occurring on the return transaction or that the customer 110 is abusing the merchant's return policy.

For example, the following pseudocode describes one embodiment of a fraud score 550 calculation using the variables 530:

SCORE=−11.6828285287;
SCORE=SCORE+A*B*−0.2903944075;
SCORE=SCORE+C*0.4347462065;
SCORE=SCORE+A*1.0274579996;
SCORE=SCORE+D*E*0.0224254388;
SCORE=SCORE+D*E$^2$*−0.0000414985;
SCORE=SCORE+F*0.4890091670;
SCORE=SCORE+G*−0.4883078393;
SCORE=SCORE+H*1.1295824050;
SCORE=SCORE+I*0.1874589093;
SCORE=SCORE+J*3.4938824622;

where the variables, based on a given customer's previous transactions with one or more of the merchant's branches, have the following meanings, and where for variables marked with a ~ symbol, transactions occurring within fifteen minutes of one another count as a single transaction:

A=Number of return transactions in any 365 day period which had the same amount
B=~Number of non-receipted return transactions in the past thirty days
C=~Number of receipted return transactions in the past thirty days
D=Average amount over all return transactions is less than $25 (0=true, 1=false)
F=Average amount of all return transactions
H=~Number of stores visited in the past thirty days where a return was made
I=~Number of return transactions in the past 365 days
J=Average number of stores visited in the twenty-four hours before all transactions In some embodiments, in order to generate a score in the range from 1-1000, the following conversion may be applied to the value for SCORE:

SCORE=round(1000/(1+exp(−SCORE)))

This set of sample calculations generates a score in which a higher score indicates a higher likelihood of risk associated with accepting the merchandise return. For example, in some embodiments, a score generated using such a set of calculations may be approved if the score is less than eight hundred, denied if the score is greater than nine hundred, and approved with a warning about the acceptance of future merchandise returns if the score is between eight hundred and nine hundred.

In other embodiments using the above-described scoring example, a customer whose merchandise return request receives a score above nine hundred on a first occasion may be approved with a warning, while the same customer may be denied on a second occasion that a merchandise return receives a score over nine hundred.

As will be familiar to one of skill in the art, a wide variety of methods for calculating and using scores may be used in conjunction and as a part of the systems and methods described herein. For example, in some embodiments, two or more scores may be generated for a requested merchandise return, and an assessment may consider some or all of the scores in making an authorization determination. As will be further familiar to one of skill in the art, systems and methods that employ other ways of assessing risk and/or otherwise deciding whether to authorize a merchandise return, such as rule-based systems, may be used in place of or in addition to calculating one or more scores 550.

To continue with the example of FIG. 5, the score 550 is then used by a return decision process to activate business rules 560 specified by the merchant 120.

For example, one or more business rules 560 may establish that customers 110 whose requested return transaction is assigned a score 550 that is above a pre-determined threshold value may have their return accepted, customers 110 whose requested return transaction is assigned a score 550 that is below the pre-determined threshold value may have their return denied. In some embodiments, one or more business rules 560 may specify that acceptance or denial of a requested return transaction may be based on more than just the calculated score 550, and may, for example, take into consideration specific factors relevant to the merchant's return policy 150.

In some embodiments, one or more business rules 560 may pertain to the issuance of return-related warnings to the customer 110 and may specify conditions under which a warning is issued to a customer 110. For example, in one score-based embodiment where a lower score indicates a higher degree of risk, if a score 550 for a requested return transaction is above the pre-determined threshold by only a small margin that falls within a predetermined range, a warning may be printed on a transaction receipt 330 presented to the customer 110 together with the return approval. As another example, in embodiments where frequency of returns causes the calculated score 550 to drop, and if another return by the customer 110 within a short period of time would likely receive a score 550 that falls below the threshold, a warning may be printed on the transaction receipt 330, notifying the customer 110 of this situation, and, in some embodiments, providing an indication to the customer 110 of the length of time during which merchandise returns are not likely to be accepted.

As described above, a variety of factors may influence a determination of whether a requested return is to be accepted or denied. When acceptance of a requested return is authorized, a further determination may be made as to whether to issue a warning to the customer 110 about possible future limitations on the customer's ability to make future merchandise returns. In some embodiments, the warning determination is implemented as a separate determination that is initiated once a requested return transaction is accepted. In other embodiments, the warning determination is implemented in conjunction with the authorization determination. For example, in one score-based system embodiment, scores that fall within one or more pre-determined ranges may cause a return to be authorized without inclusion of a warning to the customer, while scores that fall within one or more other pre-determined ranges may generate an authorization that includes a warning about possible limitations on future returns.

Once the return authorization service 100 has determined that issuance of a warning is warranted, the warning may be presented to the customer 110 in a variety of forms. In some preferred embodiments, the warning is printed or otherwise visually displayed on the receipt 330 that is provided to the customer 110 by the clerk at the point of return 125. In some embodiments, the clerk is not visually or otherwise directly notified of the inclusion of the warning. Instead, the POR device 126 may be configured to receive an indication of the warning determination from the return authorization service 100 and to automatically print the warning on the receipt 330. Additionally or alternatively, the warning may be displayed on an electronic display for viewing by the customer, may be provided via email or other electronic transmission, verbally by the clerk, hand-written at the point of return, in other printed form, such as a postcard or other mailed notification, aurally, or by another communication method.

When the warning is printed on the receipt 330, the warning may, in some embodiments, appear as a text message on the receipt. For example, a message on the receipt may state, "Dear Customer, Your current return is approved, but you will now be unable to return additional merchandise for sixty days." Thus, the warning may include information about a period of time during which merchandise return from the customer may not be accepted.

In other embodiments, a printed warning may include an explanation that, in accordance with one or more of the merchant's return guidelines, the customer may have exceeded or is likely to exceed a threshold score on an upcoming return.

Alternatively, or additionally, text printed on the receipt 330 may include a listing of the customer's recent return and/or purchase transactions.

A color code, such as a red/yellow/green color code, may be employed, in other embodiments, to indicate to the customer 110 the severity of the warning. The color code may be implemented by actually using colored ink or other colored indicator on the receipt, such as color of the receipt paper itself. Alternatively, the color code may be more of a code name that is presented to the customer using text. For example, a customer's return transaction receipt may have printed on it: "Dear Valued Customer, Your return code color is Green. Accordingly, you currently have normal return privileges," or "Dear Valued Customer, Your return code color is red. Accordingly, you may not make another return for sixty days." In such systems, "warnings" serve the function of reporting a customer's current return authorization status and may be provided to customers whose return requests have been approved, regardless of score or other assessment.

As an alternative to or in addition to the above, the return authorization service 100 may, in some embodiments, calculate a numerical score that indicates the strength of the warning and transmit that score to the POR device 126 for display to the customer 110. The score may be a score that was used by the return authorizations service 100 to determine whether to authorize the return. Alternately, the score may be based on another scoring system, such as a simplified or specialized scoring system that is selected for communicating a warning to the customer 110.

In yet another embodiment, the warning may be presented pictorially, using, for example, a bar graph, pie chart, or other graphical indicator of the customer's status with respect to the return threshold level. For example, a "thermometer" chart may characterize excessive or otherwise suspicious return behavior as getting "hot" as it approaches the threshold.

As will be understood by a practitioner of skill in the art, combinations of one or more of the foregoing warning systems, as well other similar systems may be used to provide return-related warnings for the customer requesting to make a return.

Figure 6:
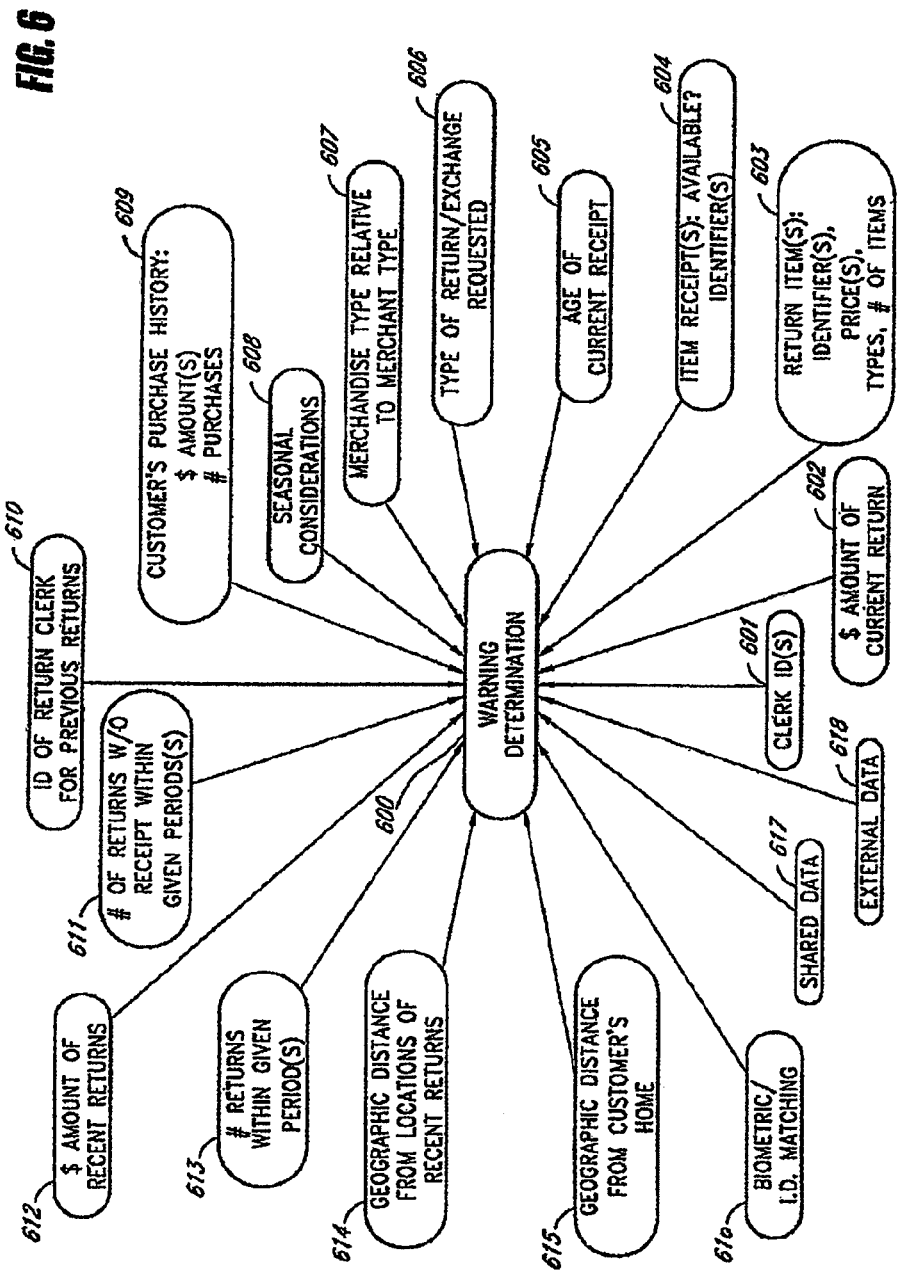
FIG. 6 depicts a set of factors that may be used to influence one embodiment of an authorization process and/or a process for determining whether to issue a warning at a point of return.

FIG. 6 depicts a set of factors 601-616 that influence one embodiment of a process for determining whether to authorize at a point of return 125. In other embodiments, a different set of factors, including some, all, or none of the factors depicted in FIG. 6, may influence the determination 600. Furthermore, as described in greater detail below, some or all of the factors may influence a determination 600 as to whether to issue a warning to the customer requesting that a merchandise return transaction be accepted.

Broadly speaking, the factors may include information about the current return, information about the customer's identification, information about the customer's past purchase and/or return history, as well as general information about the store and other related data.

For example, as depicted in FIG. 6, factors 601-607 associated with the current return transaction may include information about an identifier 601 for the clerk handling the return, and in some embodiments an identifier for the clerk(s) who handled the associated purchase transaction, a dollar amount associated with the requested return 602, the items in the current return 603, a receipt for the items being returned 604, the age of the receipt 605, the type of return 606 requested by the customer, and the type of merchandise being returned relative to the merchant type 607. Other factors associated with the current return transaction may include, but not be limited to, a location and/or identifier for the merchant, the day, date and/or time of the requested return, an amount of time lapsed since purchase of the items being returned, and information about other customers in the merchant location 120 during the time of the requested return transaction.

The dollar amount associated with the return 602 may include a net return dollar amount, for example, the dollar amount of the requested return without tax, or the net amount of the return with any discounts taken into consideration. The dollar amount 602 may additionally or alternatively include a net transaction amount that takes into consideration the amount of the return amount and the amount of any purchases and/or exchanges being made by the customer at the same time.

Information about items presented for return 603 may include information about one or more item identifiers (bar code, UPC, SKU, RFID, and the like), information about individual item prices and merchandise types, as well as a total number of items being returned.

Information about one or more purchase receipts 604 for the items being presented for return 604 may include, for example, date of the receipt, one or more data items that serve to identify the receipt, and whether a receipt is presented by the customer for each returned item.

Factors associated with the customer's identification may include a matching of the identification and/or biometric information 616 offered by the customer at the point of return 125 with stored identification and/or biometric information about the customer 110. For example, information about fingerprint, retina, voice and/or facial or other metrics may be used. Additionally, information about the customer's current and, possibly, past home addresses may serve as a factor in the determination 600 that may be used to calculate the geographical distance 615 from the customer's home to the store. The customer's home address may also be compared to stored information about the clerk's home address in order to rule out a possibly fraudulent and usually forbidden processing of the return transaction by clerk who shares a home address with the customer 110. Additional information about the customer, such as, for example, birth date, state of residence, state of identification card, identification number, loyalty card number, gift card number, checking account number, coupon number, merchandise credit slop number, phone number(s), credit card number, check number, debit card number, receipt authorization code, license expiration date, and any information available on a driver's license or other presented form of identification may also be used in as factors. In some embodiments, identification of the customer allows for determining whether the customer is included on a "positive list" of customers whose returns may be automatically accepted or authorized more easily, or a "negative list" of customers whose returns may be automatically rejected or scrutinized more carefully, or another subset of customers whose merchandise returns may be processed in a special manner.

Furthermore, other available types of information about the customer, such as credit information, check information address history, and possible shoplifting record or other criminal record information may also be useful as a factor.

A wide variety of factors 609-614 regarding the customer's history of purchase and/or return transactions may influence the determination 600 whether to authorize a merchandise return approval. For example, two factors are the number of returns 613 and the dollar amount of the returns 612, as well as the dollar amounts and identifiers of the individual merchandise items, that the customer has requested within one or more recent periods of interest, including, in some embodiments, the occurrence of any denied return transactions. Dates, times, and locations of previous requested returns may be a factor, as well as previous return authorization scores or other assessments determined for the customer and past returns for the same items as the current return. Another factor is the number of unreceipted returns 611 that the customer has requested within one or more recent periods of interest. The identifiers for the clerks handling previous returns 610 and the geographic distances from the locations of other recent returns 614, as well as the number of returns within a predetermined geographic area, may be used as factors in the determination 600 whether to issue a warning. In addition, in some embodiments, information about the customer's purchase history 609 with the merchant, including, for example, dollar amounts, numbers of items, price and identifiers of individual items, and number of recent purchases, payment types and payment history, previous warnings received, previous authorization scores, may influence the determination 600. Additional factors of interest associated with the customer's past transactions may include information about discounts and/or credit associated with previous purchases and/or overrides associated with past returns, as well as past payment information.

In addition to the above-described factors, other factors may influence an authorization determination 600, as suits the preferences of the merchant 120. As one example, the merchant 120 may desire to have seasonal considerations 608 influence the authorization determination 600, for example, rejecting fewer returns during the holiday shopping season, or alternatively, allowing more returns while issuing more warnings. Seasonal considerations 608 may also affect subsequent determinations 600, such as in embodiments in which returns made during a holiday period are "weighed" less heavily against the customer than returns made at other times of the year. Current and/or past address data associated with employees may also be a factor, as well as override information associated with the employees.

Other types of information available from external sources 618, either publicly available free information and/or purchased information may serve as factors. For example, sales tax information, postal box information, census data, householding data, identification theft data, Department of Commerce data, credit data, bank data, check data, crime data, loan delinquency data, and the like may be received from sources external to the return authorization service 100 and used to make a determination 600. Some or all such data 618 may be stored for later use and/or may be accessed from one or more external sources on an as-needed basis.

Furthermore, data that has been collected by other merchants 617, including data collected in association with purchase and/or return transactions and authorizations, may be shared with the merchant 120 and used as factors in the determination 600.

As stated above, some or all of the factors 601-616 in FIG. 6 may influence one embodiment of a process for determining whether to issue a warning at a point of return 125. In other embodiments, a different set of factors, including some, all, or none of the factors depicted in FIG. 6, may influence the determination 600. Broadly speaking, the factors may include information about the current return, information about the customer's identification, information about the customer's past purchase and/or return history, as well as general information about the store and other related data.

For example, as depicted in FIG. 6, factors 601-607 associated with the current return transaction may include information about an identifier 601 for the clerk handling the return, and in some embodiments an identifier for the clerk(s) who handled the associated purchase transaction, a dollar amount associated with the requested return 602, the items in the current return 603, a receipt for the items being returned 604, the age of the receipt 605, the type of return 606 requested by the customer, and the type of merchandise being returned relative to the merchant type 607. Other factors associated with the current return transaction may include, but not be limited to, a location and/or identifier for the merchant, the day, date and/or time of the requested return, an amount of time lapsed since purchase of the items being returned, and information about other customers in the merchant location 120 during the time of the requested return transaction.

The dollar amount associated with the return 602 may include a net return dollar amount, for example, the dollar amount of the requested return without tax, or the net amount of the return with any discounts taken into consideration. The dollar amount 602 may additionally or alternatively include a net transaction amount that takes into consideration the amount of the return amount the amount of any purchases and/or exchanges being made by the customer at the same time.

Information about items presented for return 603 may include information about one or more item identifiers (bar code, UPC, SKU, RFID, and the like), information about individual item prices and merchandise types, as well as a total number of items being returned.

Information about one or more purchase receipts 604 for the items being presented for return 604 may include, for example, date of the receipt, one or more data items that serve to identify the receipt, and whether a receipt is presented by the customer for each returned item.

Factors associated with the customer's identification may include a matching of the identification and/or biometric information 616 offered by the customer at the point of return 125 with stored identification and/or biometric information about the customer 110. Additionally, information about the customer's current and, possibly, past home addresses may serve as a factor in the determination 600 that may be used to calculate the geographical distance 615 from the customer's home to the store. The customer's home address may also be compared to stored information about the clerk's home address in order to rule out a possibly fraudulent and usually forbidden processing of the return transaction by clerk who shares a home address with the customer 110. For example, information about fingerprint, retina, voice and/or facial or other metrics may be used. Additional information about the customer, such as, for example, birth date, state of residence, state of identification card, identification number, loyalty card number, gift card number, checking account number, coupon number, merchandise credit slop number, phone number(s), credit card number, check number, debit card number, receipt authorization code, license expiration date, and any information available on a driver's license or other presented form of identification may also be used in as factors. In some embodiments, identification of the customer allows for determining whether the customer is included on a "positive list" of customers whose returns may be automatically accepted or authorized more easily, or a "negative list" of customers whose returns may be automatically rejected or scrutinized more carefully, or another subset of customers whose merchandise returns may be processed in a special manner.

Furthermore, other available types of information about the customer, such as credit information, check information address history, and possible shoplifting record or other criminal record information may also be useful as a factor.

A wide variety of factors 609-614 regarding the customer's history of purchase and/or return transactions may influence the determination 600 whether to authorize a merchandise return approval. For example, two factors are the number of returns 613 and the dollar amount of the returns 612, as well as the dollar amounts and identifiers of the individual merchandise items, that the customer has requested within one or more recent periods of interest, including, in some embodiments, the occurrence of any denied return transactions. Dates, times, and locations of previous requested returns may be a factor, as well as previous return authorization scores or other assessments determined for the customer and past returns for the same items as the current return. Another factor is the number of unreceipted returns 611 that the customer has requested within one or more recent periods of interest. The identifiers for the clerks handling previous returns 610 and the geographic distances from the locations of other recent returns 614, as well as the number of returns within a predetermined geographic area, may be used as factors in the determination 600 whether to issue a warning. In addition, in some embodiments, information about the customer's purchase history 609 with the merchant, including, for example, dollar amounts, numbers of items, price and identifiers of individual items, and number of recent purchases, payment types and payment history, previous warnings received, previous authorization scores, may influence the determination 600. Additional factors of interest associated with the customer's past transactions may include information about discounts and/or credit associated with previous purchases and/or overrides associated with past returns, as well as past payment information.

In addition to the above-described factors, other factors may influence the warning determinations 600, as suits the preferences of the merchant 120. As one example, the merchant 120 may desire to have seasonal considerations 608 influence the warning determination 600, for example, issuing fewer warnings during the holiday shopping season, or alternatively, allowing more returns while issuing more warnings. Seasonal considerations 608 may also affect subsequent determinations 600, such as in embodiments in which returns made during a holiday period are "weighed" less heavily against the customer than returns made at other times of the year. Current and/or past address data associated with employees may also be a factor, as well as override information associated with the employees.

Other types of information available from external sources 618, either publicly available free information and/or purchased information may serve as factors. For example, sales tax information, postal box information, census data, householding data, identification theft data, Department of Commerce data, credit data, bank data, check data, crime data, loan delinquency data, and the like may be received from sources external to the return authorization service 100 and used to make a determination 600. Some or all such data 618 may be stored for later use and/or may be accessed from one or more external sources on an as-needed basis.

Furthermore, data that has been collected by other merchants, including data collected in association with purchase and/or return transactions and authorizations, may be shared with the merchant 120 and used as factors in the determination 600.

With respect to the process for determining when to authorize a return and the process for determining whether to issue a warning, any one of the factors described herein with reference to FIG. 6 or in any other portion of this disclosure may be used by the decision engine 135 as a single or separate factor, or may be used in combination with any subset of the factors 601-618 to make a determination 600. For example, in some embodiments, customer identification information 616 may be used in conjunction with any one or more of the following types of information to make a determination: original receipt date, dollar amount of the return without tax, net return transaction amount, number of items being returned, SKU identifier(s) for returned item(s), RFID identifier(s) for returned item(s), and receipt identifier or combination of uniquely identifying data items for the receipt. In other embodiments, other single factors or combinations of factors may be used to make the determination 600.

Thus, the process for determining when to authorize a return and the process for determining whether to issue a warning may be highly customized to the business preferences of the merchant 120, if desired, and may be tailored to include factors deemed relevant and practical for the merchant's business.

Figure 7:
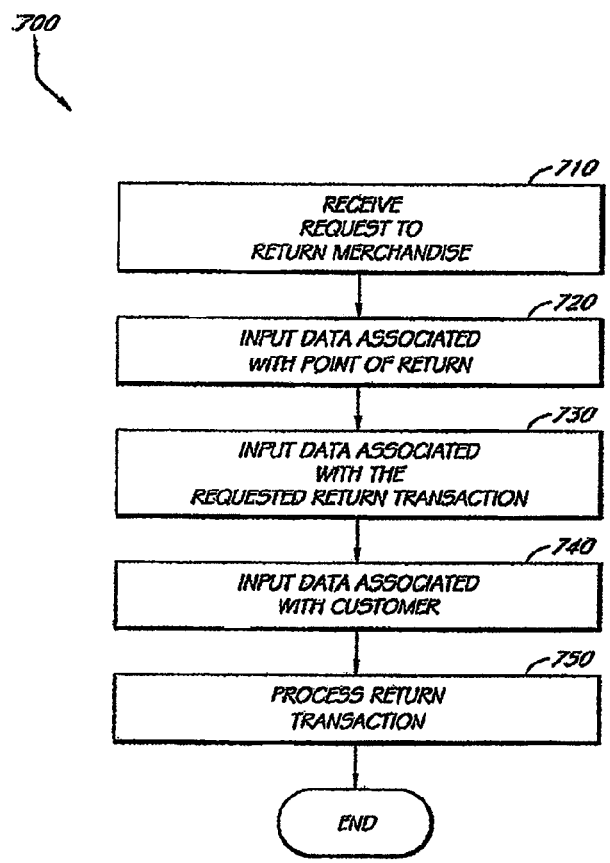
FIG. 7 is a flowchart that illustrates one embodiment of a process for collecting data at a point of return.

FIG. 7 is a flowchart that illustrates one embodiment of a process 700 for collecting data at a point of return 125. The process 700 begins in Block 710 with the receipt of a request to accept a merchandise return. Moving on to Block 720, in one embodiment, a clerk at the point of return 125 inputs data associated with the point of return 125. For example, the clerk may be prompted, or may input without being prompted, an employee identifier that allows himself or herself to be identified as handling the requested return. In other embodiments, the clerk may also input a POR device 126 terminal number, and store location for use in the return authorization determination. Information about the POR device 126 terminal number and/or store location may additionally or alternatively be provided automatically by the POR device 126 and/or may be accessed from stored information associated with the POR device 126.

In Block 730, the clerk inputs data associated with the requested merchandise return transaction. The inputted information may include, but is not limited to, any of the following types of information: date and/or time of the requested return transaction; quantity, identifiers, prices, and/or types of the merchandise items being presented for return; presence or absence of receipt(s) for the merchandise being presented for return; and a type of return being requested (for example, exchange for merchandise, exchange for cash or other form of tender, partial exchange, etc.)

In Block 740, the clerk inputs data associated with the customer. For example, any of a wide variety of types of identification information about the customer may be inputted.

As will be familiar to one of skill in the art, the above-mentioned types of information may be inputted using a wide variety of data-input method technologies associated with the POR device 126 and/or any of a variety of peripheral or associated devices. For example, the data may be input using one or more of: a keyboard, touch screen, stylus, microphone, camera, magnetic stripe scanner, bar code scanner, other electronic reader, biometric input device, or other appropriately configured devices.

In Block 750, the requested merchandise return transaction is processed. In some embodiments, an indication of an authorization determination is provided to a clerk handling the return transaction. In some embodiments, a manager or other authorized merchant representative may override the determination for any of a variety of authorized reasons and may, for example, approve a requested return transaction that the determination recommended denying.

As will be familiar to one of skill in the art, other embodiments of the process 700 described in FIG. 7 may be carried out by executing the functions described in FIG. 7 in a different order, by dividing the functions in another manner, and/or by including some or all of the functions described above in conjunction with other associated functions.

Figure 8:
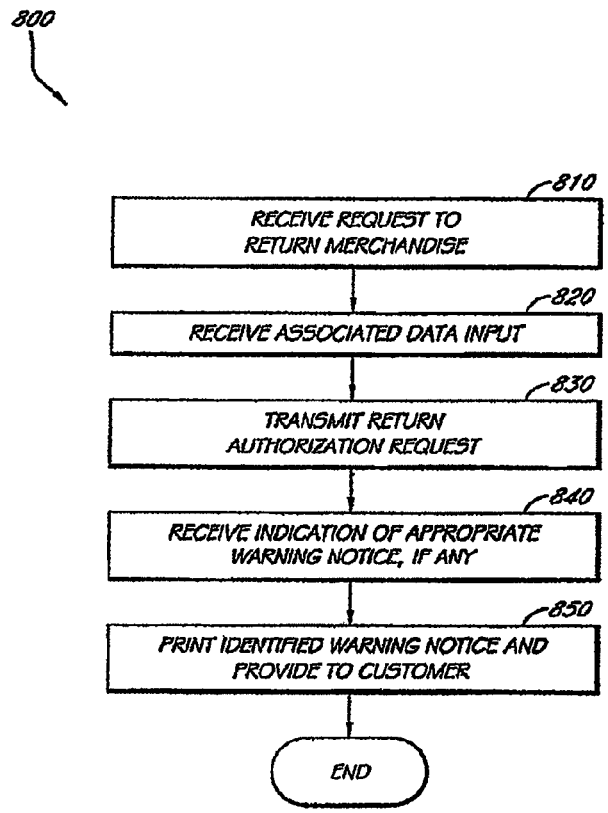
FIG. 8 is a flowchart that illustrates one embodiment of a process for issuing a warning notice to a customer at a point of return.

FIG. 8 is a flowchart that illustrates one embodiment of a process 800 for issuing a warning notice to a customer 110 at a point of return device 126.

In Block 810, the process 800 begins when the point of return (POR) device 126 receives a request for a merchandise return transaction.

In Block 820, data used for processing the requested merchandise return transactions is entered into the POR device 126, which may be a dedicated device or may be a device that is used for other purposes, as well, such as a point of sale terminal.

In Block 830, the POR device 126 transmits the entered data to the return authorization service 100 for processing of the return authorization determination.

In Block 840, the POR device 126 receives an indication of an appropriate warning notice, if one has been identified for the merchandise return transaction.

In Block 850, the POR device 126 prints, or otherwise presents to the customer 110, the selected warning. In other embodiments, in addition to or as an alternative to a warning presented by the POR device 126, a warning may be presented to the customer in any of a wide variety of other methods. Furthermore, as will be familiar to one of skill in the art, other embodiments of the process 800 described in FIG. 8 may be carried out by executing the functions described in FIG. 8 in a different order, by dividing the functions in another manner, and/or by including some or all of the functions described above in conjunction with other associated functions.

Figure 9:
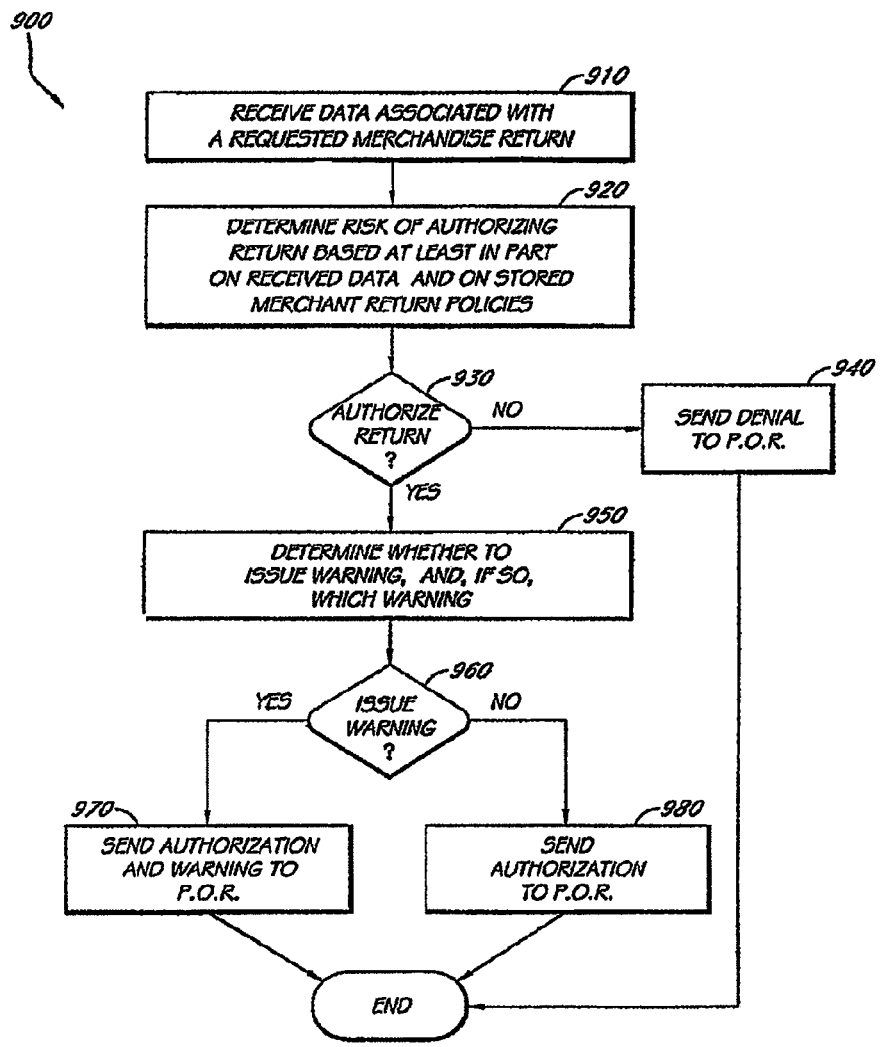
FIG. 9 is a flowchart that illustrates one embodiment of a process for determining whether to issue a warning notice to a customer at a point of return.

FIG. 9 is a flowchart that illustrates one embodiment of a process 900 for determining whether to issue a warning notice to a customer 110 at a point of return 125.

In Block 910, the return authorization service 100 receives data associated with a requested merchandise return.

In Block 920, the return authorization service 100 determines the risk of authorizing the requested return transaction based, at least in part, on the received data, as well as on stored data that may include information about merchant return policies 150, information associated with the customer's past purchase and/or return transactions, information about the clerk, and any of a wide variety of other types of information, as exemplified in FIG. 6 above.

In Block 930, the return authorization service 930 determines whether to authorize the requested merchandise return transaction.

If, in Block 930, the return authorization service 100 determines that the requested merchandise return transaction should not be authorized, the process 900 passes to Block 940, where the return authorization service 100 sends an indication of a denial to the POR device 126, and the process 900 ends.

If, instead, in Block 930, the return authorization service 100 determines that the requested merchandise return transaction should be authorized, the process 900 passes to Block 950, where the return authorization service 100 determines whether to issue a warning together with an acceptance of the requested merchandise return transaction, and if so, which warning. For example, a black-out period may be specified during which time returns from the customer may not be accepted by the merchant. Alternatively, other conditions, limitations, or explanations may be provided to the customer as part of a warning issued in association with a requested merchandise return.

The process 900 passes to Block 960 where, if the return authorization service 100 determines to issue a warning together with acceptance of the requested merchandise return transaction, the return authorization service 100 sends to the POR device 126 an authorization to accept the merchandise transaction along with a warning for presenting to the customer 110, after which the process 900 ends.

If, in Block 960, the return authorization service 100 determines not to issue a warning together with acceptance of the requested merchandise return transaction, the return authorization service 100 sends to the POR device 126 an authorization to accept the requested merchandise return transaction.

As will be familiar to one of skill in the art, other embodiments of the process 900 described in FIG. 9 may be carried out by executing the functions described in FIG. 9 in a different order, by dividing the functions in another manner, and/or by including some or all of the functions described above in conjunction with other associated functions. For example, in some embodiments, the warning may not be presented to the customer at the point of return, but may instead be mailed to the customer's home or may be otherwise presented to the customer.

While certain embodiments of the invention have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A method of processing a merchandise return comprising:
   receiving a request to authorize a merchandise return made by a consumer at a merchant's point of return;
   determining with one or more computer processors whether to authorize a credit for a current merchandise return made by the consumer at the merchant's point of return based at least in part on whether the consumer has made prior merchandise returns;

determining with one or more computer processors the acceptability of future merchandise returns by the consumer based at least in part on information about the return history of the prior merchandise returns made by the consumer; and determining whether to offer a coupon to the consumer at the merchant's point of return based at least in part on the authorization of the current merchandise return, wherein the coupon incentivizes the consumer to make a purchase with at least a portion of the credit.

2. The method of claim 1, wherein determining whether to offer the coupon to the consumer at the merchant's point of return is based at least on identification of the consumer.

3. The method of claim 1, wherein determining whether to offer the coupon to the consumer at the merchant's point of return is based at least on the amount of the credit.

4. The method of claim 1, wherein determining whether to offer the coupon to the consumer at the merchant's point of return is based at least on the number of items being returned.

5. The method of claim 1, wherein determining whether to offer the coupon to the consumer at the merchant's point of return is based at least on the type of return.

6. The method of claim 1, wherein determining whether to offer the coupon to the consumer at the merchant's point of return is based at least on whether the credit for the merchandise return is authorized.

7. The method of claim 1, wherein indicating whether future merchandise returns will be allowed, comprises presenting a warning to the consumer.

8. The method of Claim 7, wherein presenting the warning to the consumer comprises at least one of the set consisting of: printing the warning, printing the warning on a receipt for the current merchandise return, emailing the warning, electronically transmitting the warning, mailing the warning, writing a hand-written warning, displaying the warning, and providing an aural warning.

9. An apparatus for processing a merchandise return comprising:

a merchandise return device executing in at least one computer processor, the merchandise return device configured to receive information about a request to authorize a current merchandise return made by a consumer at a merchant's point of return for a credit, wherein the merchandise return device is further configured to determine whether to authorize a credit for a current merchandise return made by the consumer at the merchant's point of return based at least in part on whether the consumer has made prior merchandise returns;

wherein the merchandise return device is further configured to determine the acceptability of future merchandise returns by the consumer based at least in part on information about the return history of prior merchandise returns made by the consumer, and wherein the merchandise return device is further configured to determine whether to offer a coupon to the consumer at the merchant's point of return based at least in part on the authorization of the current merchandise return, wherein the coupon incentivizes the consumer to make a purchase with at least a portion of the credit.

10. The apparatus of claim 9, wherein the determination whether to offer the coupon to the consumer at the merchant's point of return is based at least on identification of the consumer.

11. The apparatus of claim 9, wherein the determination whether to offer the coupon to the consumer at the merchant's point of return is based at least on the amount of the credit.

12. The apparatus of claim 9, wherein the determination whether to offer the coupon to the consumer at the merchant's point of return is based at least on the number of items being returned.

13. The apparatus of claim 9, wherein the determination whether to offer the coupon to the consumer at the merchant's point of return is based at least on the type of return.

14. The apparatus of claim 9, wherein the determination whether to offer the coupon to the consumer at the merchant's point of return is based at least on whether the credit for the merchandise return is authorized.

15. The apparatus of claim 14, wherein the merchandise return device is configured to present a warning to the consumer.

16. The apparatus of claim 15, wherein the warning to the consumer comprises at least one of the set consisting of: printing the warning, printing the warning on a receipt for the current merchandise return, emailing the warning, electronically transmitting the warning, mailing the warning, writing a hand-written warning, displaying the warning, and providing an aural warning.

* * * * *